(No Model.)

McD. SIMPSON.
FLOWER POT.

No. 548,763. Patented Oct. 29, 1895.

Witnesses
E. H. Monroe
J. B. Owens

Inventor
McDuff Simpson.

By his Attorneys,
C. A. Snow & Co.

UNITED STATES PATENT OFFICE.

McDUFF SIMPSON, OF BRYAN, TEXAS.

FLOWER-POT.

SPECIFICATION forming part of Letters Patent No. 548,763, dated October 29, 1895.

Application filed December 18, 1894. Serial No. 532,219. (No model.)

*To all whom it may concern:*

Be it known that I, McDUFF SIMPSON, a citizen of the United States, residing at Bryan, in the county of Brazos and State of Texas, have invented a new and useful Flower-Pot, of which the following is a specification.

The object of this invention is to provide a flower-pot in which plants may be propagated and in which they may be kept until grown to a size sufficient for transplanting.

In the raising of tender plants, whether flowers or articles of food, it is necessary in the colder climates to start them first in a hot-house or other protected place, and this is usually done by placing them in pots or the equivalent, from which they are subsequently transplanted to the open fields. Now this transplanting often, if not invariably, results in a shaking and displacement of the roots of the plant, which is detrimental to the health of the same, and which has a decided tendency to kill or otherwise injure it. Now I propose to overcome this disadvantage by constructing the pot so that it will be capable of being removed from the plant and from the dirt in which it is arranged, as distinguished from having the dirt and plant removed from it. This end I attain by providing the pot with a removable bottom and by forming its sides of flexible sheet metal, which sides are held together by peculiarly-constructed fastening devices, the principle attribute of which is the facility with which they may be removed also as to permit the removal of the flower-pot.

Figure 1:
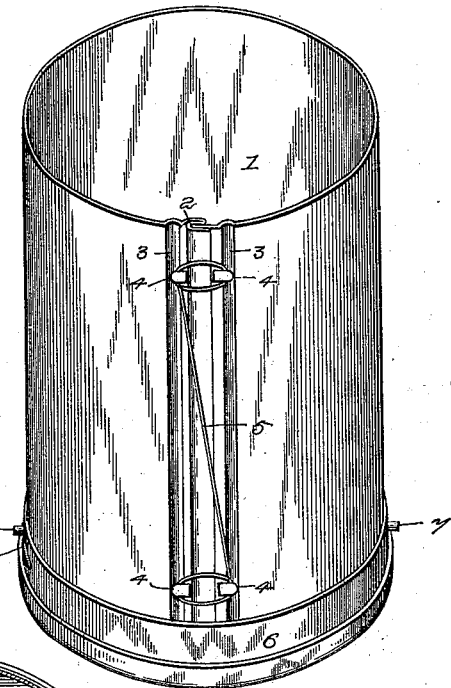
Figure 5:
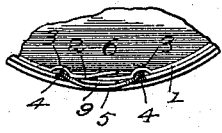
Figure 2:
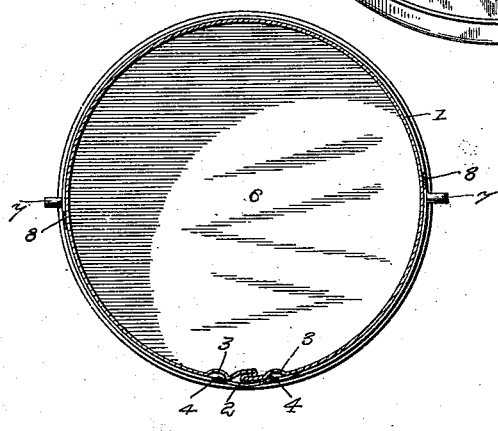
Figure 3:
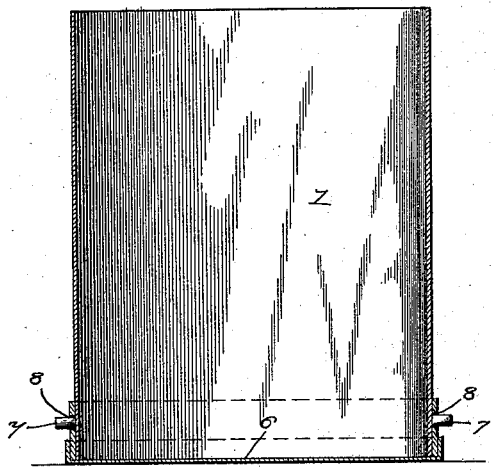
Figure 4:
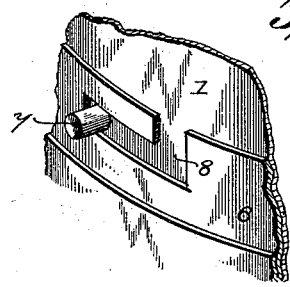

In the drawings, Figure 1 is a perspective view of a flower-pot constructed after the manner of my invention. Fig. 2 is a horizontal section taken through the flower-pot and illustrating more particularly the fastening devices therefor. Fig. 3 is a vertical section. Fig. 4 is an enlarged side elevation illustrating the bayonet-slot by which the bottom is held in place. Fig. 5 is a detail view of a modification.

My improved device is formed preferably of tin or galvanized iron, and it is essentially formed of some flexible sheet metal. Galvanized iron is best used in the more expensive grades of the device, since it is more durable, while tin is, perhaps, best adapted for the manufacture of smaller forms and those which are not intended for use in transmitting the plants long distances.

The reference-numeral 1 indicates the plate or sheet of metal which forms the sides of my improved device, and this is constructed as a rectangular blank and has one edge bent inward and back upon the main portion and finally outward to form a vertically-extending pocket 2. In this pocket 2 the opposite edge of the plate 1 is arranged, and this plate is held in place by means of fastening devices, which will now be described.

Formed in each contiguous edge of the plate 1 and parallel therewith are the inwardly-extending and concaved grooves 3, which are one for each edge, and the groove adjacent to the pocket 2 extends parallel therewith, while the remaining groove extends parallel with the edge to which it is secured. Rigidly secured by soldering or otherwise to the contiguous edges of the plate 1 are the fingers 4, which are preferably two for each edge, and which are arranged near the upper and lower sides of the plate 1 and in two pairs, the members of which are horizontally aligned with each other. The fingers 4 are secured to the outer sides of the grooves 3, or those sides which are nearest to the joined sides of the plate 1, and project over the grooves 3 to a point about midway the width thereof. This arrangement forms hooks, around which the wire 5 may be wrapped. Thus the wire is first wrapped around the lower hooks or fingers 4 and thence passed up and wrapped around the upper pair of the same devices, the free end of the wire being secured by twisting or wrapping it around one of the fingers. Thus it will be seen that one edge of the plate 1 may be seated within the pocket 2 and the parts held in this position by means of the wire 5 operating with the fingers 4 and grooves 3.

The bottom of the flower-pot consists of a cap 6, the flanges of which are capable of embracing the lower edge of the plate 1 and thereby effectually closing the said end. The bottom 6 is held in place by means of the pins 7, which are two in number, and which project radially from the bottom portion of the pot and on opposite sides thereof. These pins co-operate with the bayonet-slots 8, formed in the flange of the bottom 6, and these slots are disposed oppositely from each other and on diametrically-opposite sides of the cap. By these means the cap may be placed over the lower edge of the plate 1 and the respective slots and pins engaged with each other so as to hold the cap in place.

The pot may be formed with slanting or perpendicular sides, as may be desired, and it will be understood that this is not an essential portion of my invention. I have shown the sides to be perpendicular in the drawings; but it will be obvious that this may be changed to a slanting form.

Fig. 5 illustrates a modification of the joint between the edges of the sides 1, and this consists in a supplemental strip 9, which is soldered or otherwise secured to the edge of the plate 1, which carries the pocket 2 of Figs. 1 to 4, inclusive, and which forms the equivalent of said pocket. Either of these devices may be used at the option of the manufacturer; but it is thought that the form of the first three figures is preferable because of its simplicity and consequent cheapness and durability.

The use of my invention will not require much additional explanation, and it will suffice for me to say that the plants are raised in the pots, as is usual in the art of trucking and horticulture, and are kept in the same until their size and the condition of the climate and weather will permit their transfer to open fields. This is effected by forming in the ground a hole sufficient in size to receive the pot, after which the bottom is taken off the same and the fastening devices loosened, so as to permit the sides to be withdrawn from the dirt and from the roots embedded therein. This will make it easy to deposit the dirt in the hole without the slightest disturbance of the former and of the roots of the plant and without otherwise injuring the latter.

My invention is also useful for shipping plants, and its durability and convenience in handling make it especially useful and advantageous for this purpose. After the pots have been emptied of their contents their several parts may be disconnected, and this will enable them to be packed in very small spaces and reshipped or stored away, as may be desired, and with the greatest possible convenience.

Various changes in the form, proportion, and the minor details of construction may be resorted to without departing from the principle or sacrificing any of the advantages of this invention.

Having described the invention, I claim—

1. A flower pot consisting of a plate of flexible sheet metal, capable of being bent into a circular form and provided with interlocking contiguous edges, one or more fingers projecting from said plate contiguous to said edges, a flexible wire adapted to be bent or wrapped around said fingers whereby to hold the edges in interlocked position, and a removable cap fitting over one end of the plate when made to assume said circular form and forming a bottom therefor, substantially as described.

2. A flower pot consisting of a plate of flexible sheet metal, capable of being bent into cylindrical form and having at one contiguous edge a pocket within which the remaining edge fits, one or more fingers projecting from either contiguous edge in mutual alignment, a flexible wire adapted to be bent or wrapped around said fingers, whereby the edges are tied together, a pin laterally projecting on either side from the outer lower edge of said cylindrical bent plate, and a cap provided with a cylindrical peripheral flange adapted to fit snugly over the lower end of said cylinder to form a bottom therefor and provided with bayonet slots in its upper edge to co-operate with said pins to retain said cap in removable adjustment on said cylinder, substantially as described.

3. A flower pot consisting of a flexible plate of sheet metal capable of being bent into a circular form and having adjacent to each contiguous edge a groove extended inwardly and parallel with the said edges, fingers rigidly secured to the outer sides of the grooves and projecting over the respective grooves, a wire capable of engaging the fingers and holding the edges of the plate together, and a cap capable of being removably connected to one end of the plate when bent to be circular in form, substantially as described.

In testimony that I claim the foregoing as my own I have hereto affixed my signature in the presence of two witnesses.

McDUFF SIMPSON.

Witnesses:
A. D. McCONNICO,
J. P. BUNONGS.